United States Patent [19]

Bruttini

[11] Patent Number: 5,121,120
[45] Date of Patent: Jun. 9, 1992

[54] PROGRAMMABLE DIGITAL MEASURING AND CONTROL INSTRUMENT FOR A VACUUM GAUGE

[76] Inventor: Roberto Bruttini, Via Gottardo 103, 10155 Torino, Italy

[21] Appl. No.: 598,924

[22] Filed: Oct. 16, 1990

[30] Foreign Application Priority Data

May 4, 1989 [IT] Italy .................. 67325 A/89

[51] Int. Cl.$^5$ ........................... H03M 1/52
[52] U.S. Cl. ..................... 341/167; 341/106; 341/140
[58] Field of Search ........... 341/140, 75, 106, 128, 341/138, 167

[56] References Cited

U.S. PATENT DOCUMENTS

| | | | |
|---|---|---|---|
| 3,824,585 | 7/1974 | Meijer | 341/140 |
| 3,930,252 | 12/1975 | Storar | 341/128 |
| 4,511,882 | 4/1985 | Keyes, IV et al. | 341/138 |
| 4,764,751 | 8/1988 | Kimura | 341/140 |
| 4,862,168 | 8/1989 | Beard | 341/140 |

Primary Examiner—A. D. Pellinen
Assistant Examiner—Marc S. Hoff
Attorney, Agent, or Firm—Paul & Paul

[57] ABSTRACT

A digital and programmable measuring and control instrument comprising a digital-analog converter receiving an analog signal from a pressure transducer and converting it into a digital signal and dividing the same in about 4,000 parts separated in thousands, hundreds, tens and units. The so divided signal is delivered to programmable memories that evaluate the level thereof and refer it to stored values, in such a way as to produce a signal to be shown by display means indicating the precise and actual measurement. The output digitalized and linearized signals from the programmable memories are also delivered to additional programmable memories that evaluate them and in turn transmit programmed signals to a digital-analog converter that generates in response a signal to be used for commanding operative units. Additional control signals from the programmable memory are used as actuatable signals for control or alarm units.

16 Claims, 2 Drawing Sheets

PROGRAMMABLE DIGITAL MEASURING AND CONTROL INSTRUMENT FOR A VACUUM GAUGE

BACKGROUND OF THE INVENTION

The present invention concerns a programmable digital measuring and control instrument adapted to display numerical values coming from analog to digital conversion of electric signals in form of numeric data.

Electronic metering devices or apparatuses, both analog and digital, provide a more or less accurate measurement of a selected quantity (e.g. Volt, Ampere, etc.) relating to an electric signal. Therefore, the use of such electronic metering devices for measuring physical quantities of a kind different from the electric one (e.g. a pressure) requires the interposing of a suitable transducer adapted to convert into an electric signal a given physical quantity.

It is evident from the above that when the electric signal is a non-linear function of the physical quantity under consideration, the information supplied by such instruments is not easy to be interpreted, unless a proper conversion is carried out by means of known tables.

For a better understanding of the above FIG. 1 shows, as an example, the characteristic curve of the electric signal generated by a transduction device as a function of the residual inner pressure within a housing, e.g. a ion pump used as a vacuum gage or vacuometer, representing the quantity to be measured. As it is easily noted, the current values vary in a non-linear manner with respect to the pressure and the knowledge of such values is an indirect measurement which is of little use for an operator needing as a matter of fact a direct display of the pressure value.

Anyhow, while in an analog instrument it is possible to overcome such drawback by means of suitable dials printed with non-linear scales and having scale graduations directly reading the values of the quantity being considered instead of that of the electric signal actually measured by the instrument, this is not possible for instruments of digital type.

The present invention aims to provide a programmable digital measuring instrument wherein the level of the input electric signal can be displayed by means of digit, letters or both, programmable as desired, and therefore is capable to be programmed in such a way as to display data that varies in a linear manner even when the input signal varies in a non-linear manner with respect to the quantity to be measured.

A further object of the invention is that of providing a digital and programmable measuring instrument able to store several series of data corresponding to different scales for a same input signal so as to provide for a wider use of the instrument over a longer period of time.

SUMMARY OF THE INVENTION

The above and other objects and advantages, as will become clear in the following, are achieved by a digital and programmable measuring and control instrument comprising:

conversion means for converting analog signals coming from generating means into digital signals, said signals being delivered to a circuit comprising a plurality of buffer means, each storing values referred to units, tens, hundreds and thousands, respectively; said conversion means further generating sequential pulses for controlling said buffer memories and for display components;

first programmable storing means adapted to provide predetermined values for each converted signal;

switching means for the signals coming from said first programmable storing means, said switching means being sequentially activated by said control pulses generated by said conversion means;

second programmable storing means adapted to provide predetermined values for each value of the signals coming from said first storing means, said predetermined values being adapted to be received by additional conversion means for converting digital signals into analog signals;

programmable decoding means adapted to receive signals coded by said switching means and to transmit the decodified signals to display means.

A preferred embodiment of the invention will now be disclosed in an illustrative and non limiting example and with reference to the attached drawings.

DESCRIPTION OF A PREFERRED EMBODIMENT

Figure 1:
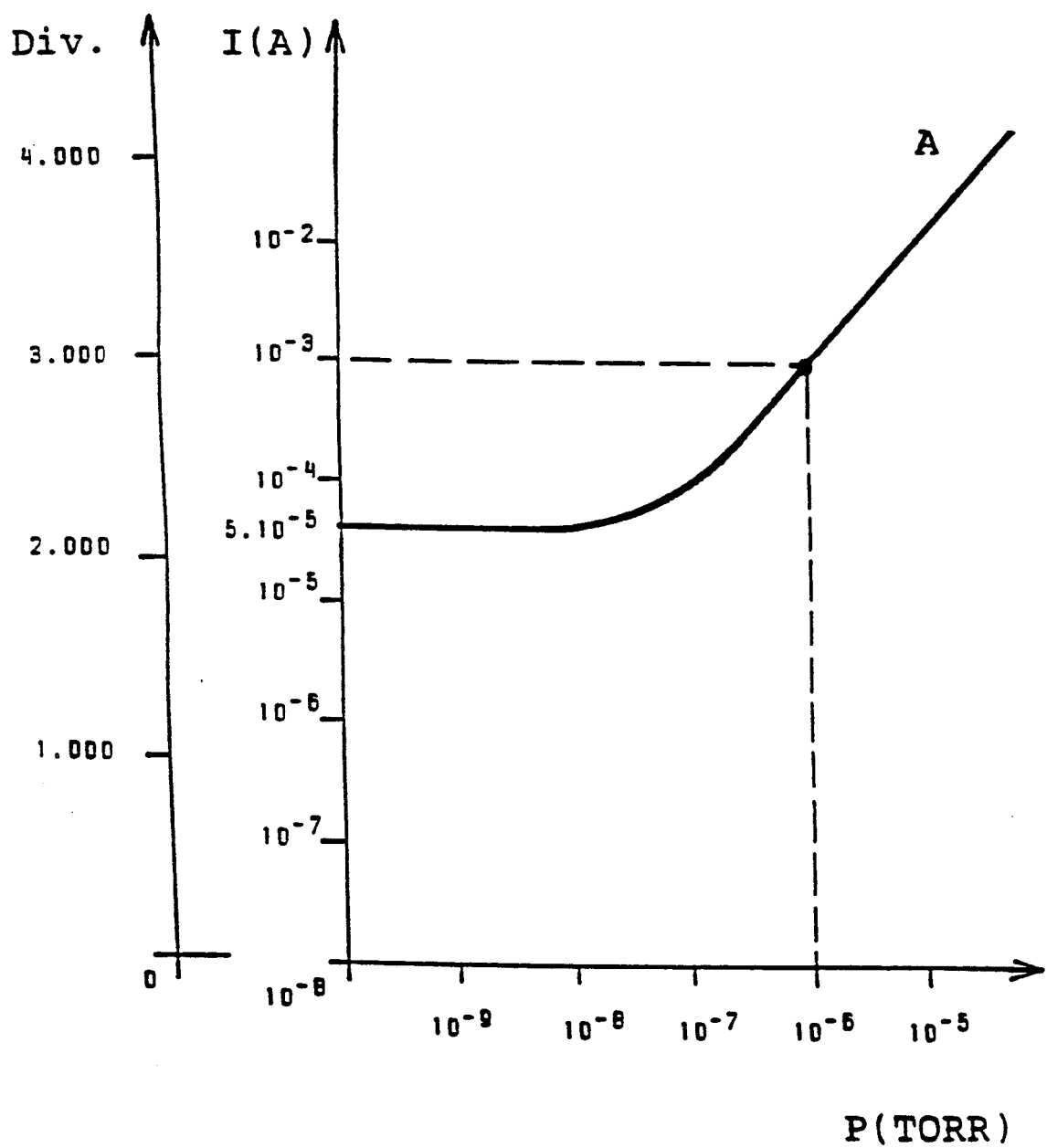
FIG. 1 illustrates a curve "A" representing a typical current vs pressure function within a ion pump used as a vacuum gage, wherein the current values are related to an adjacent scale of coded numbers in programmable memory devices according to the present invention.
Figure 2:
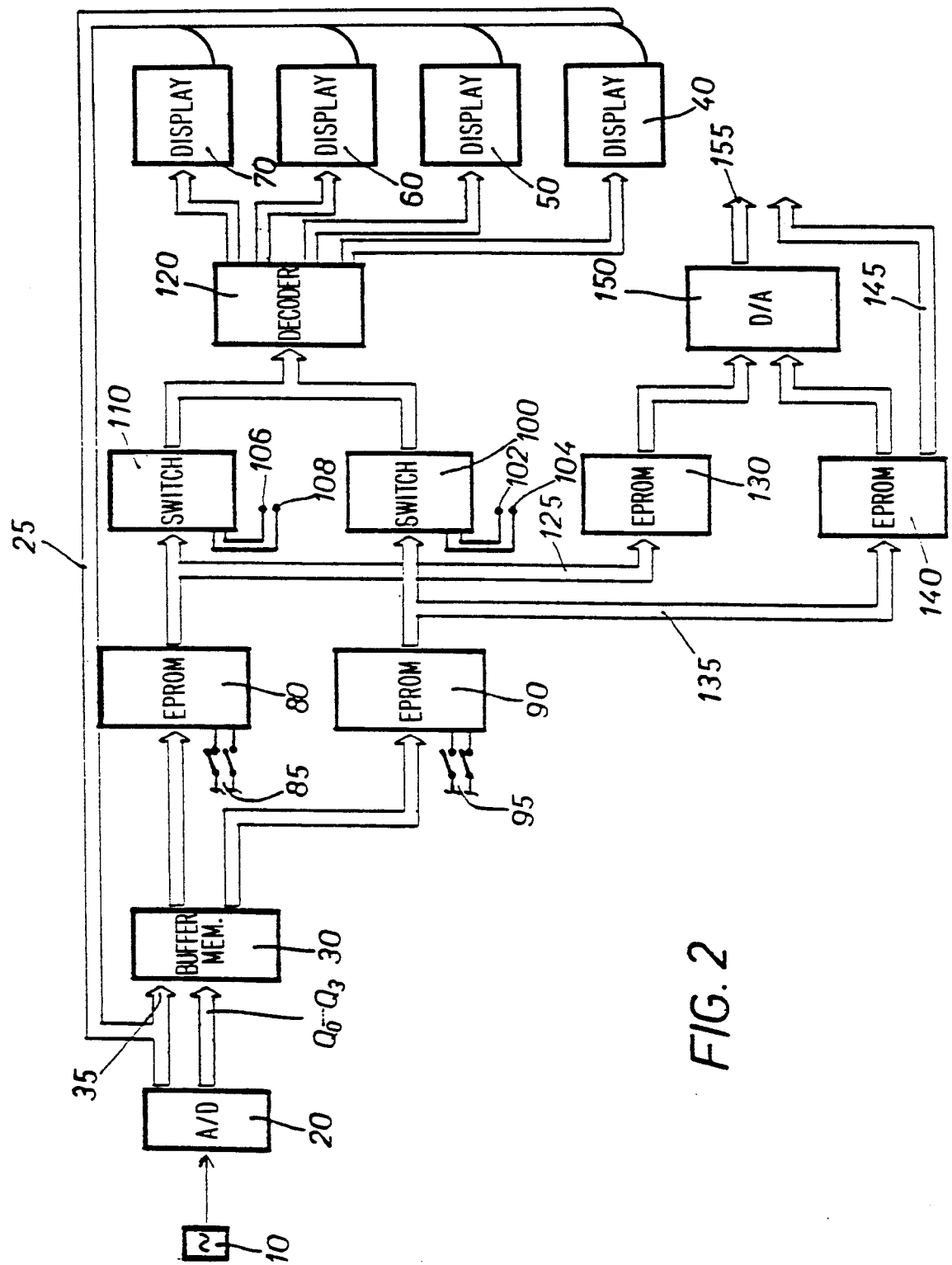
FIG. 2 is a block diagram of a digital and programmable measuring and control instrument according to the invention.

With reference to the block diagram shown in FIG. 2, an analog signal, even a non-linear signal, from a signal generator 10 of any type, such as the vacuum gage mentioned with reference to FIG. 1, is input to an analog-digital converter 20 that converts, through the dual slope method which is well known to the skilled of the art, the input voltage into a series of pulses counted by counters within the converter itself and transmitted to four outputs $Q_0, \ldots Q_3$.

Moreover, the analog-digital converter 20 divides the input signal into about 4,000 parts. For example, referring to a signal ranging between a minimum value of $-10$ mV and a maximum value of $+10$ mV, each subdivision is of 0.005 mV, and to each one of them it is possible to associate a different datum that can be later displayed on a display through processing by means of electronic components described hereinafter.

Such subdivision allows for a displaying, on displays 40, 50, 60 and 70 shown in FIG. 2, linearly varying data even when the input signal refers to a signal that can be represented by a a non-linear curve, such as the one shown as "A" in FIG. 1.

An additional function provided by the analog-digital converter 20 is that of sequentially activating the cathodes of displays 40, 50, 60, 70, corresponding in this order to the thousands, hundreds, tens and units digits, by supplying a positive voltage pulse.

Besides being transmitted to the above mentioned cathodes of displays 40 to 70 along line 25 shown in FIG. 2, this positive sequential pulse is also delivered to the clock inputs of a plurality of a buffer (temporary) memories 30 along a line 35.

A preferred embodiment of the present invention provides four of such memories 30, one for the thousands digits, one for the hundreds digits, one for the tens digits and one for the units digits, the memories being D Flip Flops and therefore adapted to be enabled or disabled by a clock signal being at a high level or at a low level, respectively, with reference to a constant positive voltage signal.

The analog-digital converter 20 sequentially supplies output information concerning the thousands, then the hundreds, then the tens and finally the units digits.

Such information is codified by means of a four bit binary code $Q_0 \ldots Q_3$, and then transmitted to the said buffer memories 30.

In accordance with the sequence pulses from the analog-digital converter, each memory 30 routes the data from this latter to a pair of programmable and erasable read only memories, known in the art as EPROM memories, that have been programmed in advance as desired.

Such memories have a number of internal addresses large enough to allow the storage of four series of data comprising four different scales (e.g. in mVolt, in mm Hg, in Pa, in millibar or other auxiliary scales).

With the aid of a computer, in the programmable memories 80 and 90 it is possible to store given values in accordance with a known law, said values being output by the programmable memory devices 80 and 90 when the input receives the memory address of the location containing such value.

In order to better understand what above discussed, reference is to be made to FIG. 1 wherein to the level of curve "A" codified as 3,000, the memory devices 80 and 90 associate the number E-6 (Torr.) corresponding to the value $1.10^{-6}$ Torr to which is related the measured current.

The programmable EPROM memory 80 is used to display the units and the tens, whereas the memory 90 is used to display the hundreds and the thousands.

The selection of one of the four scales takes place by means of four switches indicated at 85 and 95. As a function of their closed or open positions, such switches apply to the input of the programmable memories 80 and 90 one of the four possible binary configurations, each of which is associated to a different scale.

The output signals from the programmed memories 80, 90 are now linearized and then applied (as units and tens digits) to the inputs of a second electronic switching device 110.

The above mentioned electronic switching devices are made up by integrated circuits known as three-state buffers.

The transmission of signals through such switches 100 and 110 is enabled or blocked by sequential pulses from the analog-digital converter that firstly allows the passage of the most significant values constituted by the thousands digits, and then those of the hundreds and tens, to end with the least significant value constituted by the units, and thereafter to resume the cycle with this sequence.

Such sequential pulses are indicated, in the above order, by the references 102, 104, 106, 108 in FIG. 2.

The output signals from the electronic switches 100 and 110 are led to an electronic device 120 comprising a programmable decoder adapted to display the numerical data from said switches and to be programmed in such a manner as to supply also alphabet letters in correspondence with the above numeric data.

The digital signals coming from the programmable memory devices 80 and 90 and transmitted to the switching means 100 and 110 are also led to a further pair of programmable memories (EPROM) 130 and 140 that, thanks to a proper programming, delivers digital control signals along a line indicated at 145 in FIG. 2 to subsequent actuating devices (not shown), and other digital signals to a 12 bit input digital-analog converter 150 whose output analog signal indicated at 155 in FIG. 2 is used to control or command additional devices that are not shown.

Moreover, the four most significant bits at the output of programmable memory 140, if so requested, are used as command signals for alarm devices actuated by means of not shown relays.

Such command signals are determined through the binary value selected by switches 85 and 95 and the level of the bit representing the thousands.

From the description of the structure and the working of the present measuring and control instrument, and with reference to FIG. 1, it is evident that by means of a proper programming of the programmable memory devices 80 and 90 it is possible to employ voltage transducers different from the one above illustrated, such different transducers supplying signals that vary in a different way and that can anyhow be displayed and controlled according to the disclosed modalities. Therefore the present instrument has an extended number of applications.

Of course a preferred embodiment of the digital and programmable measuring and control instrument has been disclosed, particularly for non-linear signals, but the present invention is not limited to the above illustrated embodiment, extending to any other equivalent circuital embodiment within the scope of the inventive idea as defined by the attached claims.

I claim:

1. A programmable digital measuring and control instrument for a vacuum gauge comprising:

conversion means, for converting analog signals coming from an analog signal generating means into digital signals, said digital signals being delivered to a circuit comprising a plurality of buffer means, each storing a four digit BCD code of the units, tens, hundreds and thousands, respectively; said conversion means further generating sequential pulses for controlling said buffer memories and for display components;

first programmable storing means adapted to provide predetermined values for each converted signal;

switching means for the signals coming from said first programmable storing means, said switching means being sequentially activated by said control pulses generated by said conversion means;

second programmable storing means adapted to provide predetermined values for each value of the signals coming from said first storing means, said predetermined values being adapted to be received by additional conversion means for converting digital signals into analog signals;

programmable decoding means adapted to receive signals coded by said switching means and to transmit the decoded signals to display means.

2. A programmable digital measuring and control instrument as claimed in claim 1, wherein said conversion means of analog signals comprises an analog-digital converter of the dual slope type, adapted to provide a digital representation of the signal at one of 4,000 levels.

3. A programmable digital measuring and control instrument as claimed in any one of claims 1 and 2, wherein the sequential control pulses are generated by said analog-digital converter.

4. A programmable digital measuring and control instrument as claimed in claim 1, wherein said buffer memories comprise D flip-flops.

5. A programmable digital measuring and control instrument as claimed in claim 1, wherein said first programmable storing means comprises programmable and erasable read only memories "EPROM".

6. A programmable digital measuring and control instrument as claimed in claim 1, wherein said switching means comprises three-state buffer circuits.

7. A programmable digital measuring and control instrument as claimed in claim 1, wherein said second programmable storing means comprises programmable and erasable read only memories "EPROM".

8. A programmable digital measuring and control instrument as claimed in claim 1, wherein said programmable decoding means comprises integrated circuits adapted to supply decoded signals to a display means to display letters and numbers.

9. A programmable digital measuring and control instrument as claimed in claim 1, wherein said digital-to-analog conversion means comprises a 12 bit input digital-analog converter.

10. A programmable digital measuring and control instrument for a vacuum gauge comprising:

an analog signal generator of variable pressure measurements adapted to provide an analog signal within a given range of values;

analog-to-digital conversion means connected to said signal generator for converting said analog signal from said generator into one of a number of digital codes, said conversion means having four output lines for sequentially providing output bits of said digital code corresponding to a BCD code of the units, tens, hundreds and thousands, respectively, said conversion means further generating sequential control pulses;

temporary storage means connected to said outputs of said conversion means for storing said bits corresponding to the units, tens, hundreds and thousands, respectively;

first read only memory conversion means connected to said outputs of said temporary storage means, said memory conversion means adapted to provide predetermined values for each set of input bits;

switching means connected to said memory conversion means, said switching means controlled by said control pulses generated by said conversion means;

a decoder connected to said switching means, said decoder controlled by said control pulses generated by said conversion means; and a display means connected to said decoder for displaying the units, tens, hundreds and thousands digits, respectively, of said measuring signal, said display means controlled by said control pulses generated by said conversion means.

11. A programmable digital measuring and control instrument as claimed in claim 10, wherein said conversion means of analog signals is an analog-to-digital converter of the dual slope type adapted to divide the input signals into 4,000 parts.

12. A programmable digital measuring and control instrument as claimed in claim 10, wherein said temporary storage means comprises four separate memories, one for its thousands digits, one for the hundreds digits, one for the tens digits and one for the units digits.

13. A programmable digital measuring and control instrument as claimed in claim 10, wherein said first read only memory conversion means comprises a pair of programmable and erasable read only memories.

14. A programmable digital measuring and control instrument as claimed in claim 13, wherein said programmable and erasable read only memories incorporate four different scales, each of which is selected by means of four switches.

15. A programmable digital measuring and control instrument as claimed in claim 10, wherein said switching means comprises a pair of three-state buffer circuits that are enabled by said control pulses generated by said conversion means.

16. A programmable digital measuring and control instrument as claimed in claim 10, further comprising an additional pair of programmable read only memories connected to said first read only memory conversion means, the output of these additional memories being connected to a digital-to-analog converter whose output being an analog control or command signal.

* * * * *